June 8, 1926.
R. W. CAMMACK
DENTAL FLOSS HOLDER
Filed Jan. 26, 1926
1,588,307
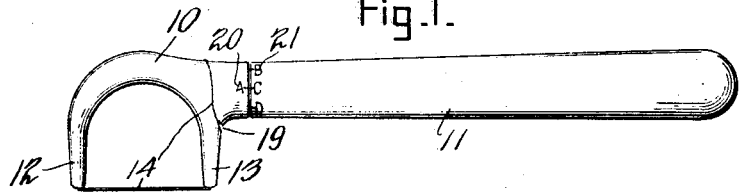
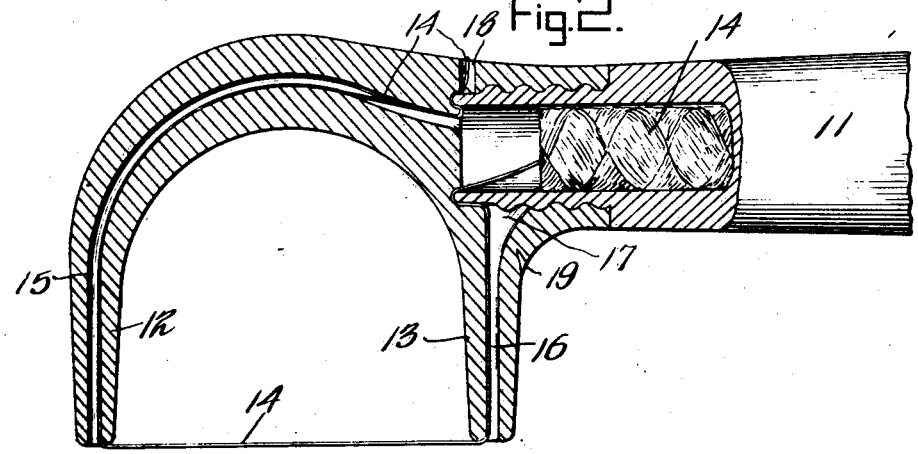
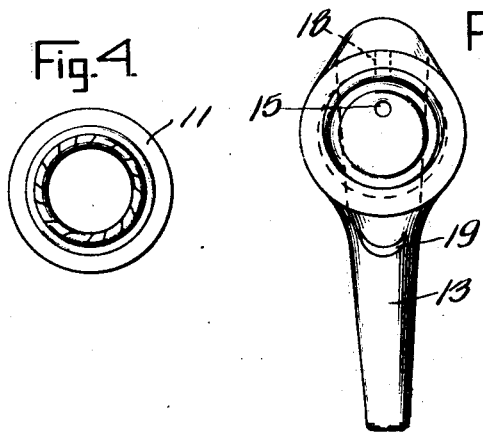
Inventor
Robert W. Cammack
By
Attorney Patented June 8, 1926.

1,588,307

UNITED STATES PATENT OFFICE.

ROBERT WALTER CAMMACK, OF WHITTIER, CALIFORNIA.

DENTAL FLOSS HOLDER.

Application filed January 26, 1926. Serial No. 83,927.

My invention relates to a dental floss holder designed for holding a strand of floss taut in convenient position to be readily inserted between the teeth.

An object of the invention is to provide a device of this character which is of such a form as to be capable of conveniently reaching all of the teeth with minimum effort on the part of the operator and by means of which foreign matter may be efficiently dislodged.

Another object of the invention is to provide a holder which is attractive in appearance and constructed of material which will not injure the teeth upon contact therewith.

A further object of the invention is to provide a device capable of holding a supply of dental floss which may be continuously used until the supply is exhausted, of simple design and construction and consequently inexpensive to manufacture.

Referring to the accompanying drawings which are made a part hereof and on which similar reference characters indicate similar parts:—

Figure 1 is a side elevation,

Fig. 2, an enlarged longitudinal sectional view,

Fig. 3, an end elevation of the holder with the handle removed, and

Fig. 4, an end view of the handle.

As shown in the drawings the invention comprises a body 10 and a handle 11. The body 10 is provided with legs 12 and 13, said legs being spaced apart and across the extremities of which a dental floss 13 is adapted to be tightly stretched. The legs 12 and 13 are provided with passages 15 and 16 respectively extending longitudinally through the same, the passage 15 in the leg 12 extending centrally through the body and terminating in a hollow socket 17 into which the forward end of the handle is threaded. The passage 16 of the leg 13 also terminates in said socket, the handle and the body being threaded for cooperative relation.

The handle 11 is formed with a hollow interior for receiving a spool of dental floss 14, said floss being adapted to be threaded out through the opening 16 to the extremity of the leg 13 and across to the opposite leg 12 and through the opening 15 around into the socket of the body and an opening 18 is provided through the socket to permit the floss to be threaded out to the outside of the body of the device so it may be continuously used and broken off until the supply in the hollow handle is exhausted. In order to facilitate the breaking of the floss I provide a small slot 19 on the outer side of the leg 13 adjacent the handle 11.

In threading the holder it is necessary after placing the floss in the handle to thread the same through the passage 16 and leave a sufficient portion extending to reach across the space between the legs and through passages 15 and 18 whereupon the handle is screwed into the body of the holder and the surplus floss is removed by cutting it off in the slot 19. After the holder is once threaded it is not necessary to thread it again until the floss is exhausted or broken. The floss will not break if used properly and the handle is provided with a sufficient cavity to hold several yards of floss, sufficient to last several months in ordinary usage.

I use a floss which is adapted to be unwound from its interior, however, obviously any kind of floss which will unwind easily may be used. In order to tension the floss as it is used I provide an annular recess in the bottom of the handle of the holder and provide an operating end portion on the handle 11 adapted to fit into said annular recess for by this structure the floss may be clamped between the end of the handle and the holder and held in taut position as shown in Fig. 4. The extremity of the handle which fits into the recesses is preferably slightly roughened to cause the same to grip the floss as it engages it. As shown in Figure 2 when the handle is screwed into the holder the floss will first be engaged by the portion of the handle adjacent the opening in the leg 13 consequently the floss may be pulled through the opening 18 and the handle screwed home to clamp the floss adjacent the opening 18 as well as at the first point of contact adjacent the opening in the leg 13. In order to determine the amount necessary to turn the handle into the holder to hold the floss tight at one end or both ends or to leave both ends free I provide indicia 20 and 21 on the holder and handle respectively. As shown when the characters A and C are in opposite relation the floss will be held only at its entrance end into the leg 13 while if the handle is rotated to bring the character D opposite the character A the floss will be clamped at both its entrance and exit ends inside the holder while if the handle be unscrewed so that the character B is opposite the character A the floss will be released and may be freely pulled through the holder.

It will be obvious to those skilled in the art that various changes may be made in my device without departing from the spirt of the invention and therefore I do not limit myself to what is shown in the drawings and described in the specification but only as indicated in the appended claims.

Having thus fully described my said invention, what I claim as new and desire to secure by Letters Patent, is:—

1. A holder for dental floss comprising a pair of spaced prongs adapted to have dental floss tightly stretched across the same, means for attaching said prongs to a handle, means for clamping one end of the dental floss when the handle is in one position and adapted to clamp both ends of the floss when the handle is in another position, and indicia for determining the relative position of the handle with reference to its attaching means for determining whether one or both ends of the floss are secured, substantially as set forth.

2. A dental floss holder comprising a pair of spaced prongs, an integrally threaded socket at right angles to and in the plane of the prongs, a hollow handle having external threads for engagement with the socket, passages through the socket for dental floss, and a shoulder adjacent one of the passages whereby when the handle is screwed into the socket the forward position thereof will engage one end of the dental floss prior to its engagement with the other end, substantially as set forth.

3. A dental floss holder comprising a pair of spaced prongs, an integrally threaded socket at right angles to and in the plane of the prongs, a hollow handle having external threads for engagement with the socket, passages through the socket for dental floss, a shoulder adjacent one of the passages whereby when the handle is screwed into the socket the forward portion thereof will engage one end of the dental floss prior to its engagement with the other end, and indicia for determining relative position of the parts, substantially as set forth.

4. A holder for dental floss comprising a pair of spaced prongs, a socket in one of the prongs, a passage in each of said prongs terminating in said socket, a hollow handle adapted to contain a supply of dental floss, said hollow handle being adapted to fit in the socket, the passage for floss in one of said prongs terminating in the side of the socket and the passage for floss in the other of said prongs terminating in the bottom of the socket, whereby when the handle is inserted in the socket the floss in the side passage will be engaged before the floss in the bottom passage, substantially as set forth.

5. A holder for dental floss comprising a pair of spaced prongs having a socket formed at one side thereof, a hollow handle for engagement in said socket and adapted to contain a supply of dental floss, a passage extending from the side of the socket through one prong, a passage extending from the bottom of said socket through the other prong, whereby the dental floss will be engaged and clamped adjacent the inner end of the passage in the side of the socket prior to its being clamped at the inner end of the passage in the bottom of the socket, substantially as set forth.

6. A holder for dental floss comprising a pair of spaced prongs adapted to have dental floss tightly stretched across the same, a handle for said prongs, means for clamping one end of the dental floss when the handle is in one position relative to said prongs and adapted to clamp both ends of the floss when the handle is in another position relative to said prongs, substantially as set forth.

7. A holder for dental floss comprising a pair of spaced prongs, a handle for holding dental floss stretched across said prongs, said handle being adapted to engage one end of the floss when the handle is partly in position and adapted to engage and clamp the other end of the floss when the handle is completely in position, substantially as set forth.

8. A holder for dental floss comprising a pair of spaced prongs, passages therethrough terminating at the base of one of the prongs and unitary means operable to engage the ends of the dental floss, but being adapted to engage one end of the floss before it engages the other end thereof, substantially as set forth.

9. A holder for dental floss comprising a hollow handle, a pair of spaced prongs disposed in the plane of the handle and at right angles thereto, a socket in the side of one of said prongs, a passage for dental floss in each of said prongs terminating in said socket, and means for clamping the dental floss at its entrance into one of said prongs when the handle is partly in position, in the socket, said means being adapted to engage the floss at the extremity of the passage in the other prong when the handle is completely in position.

10. A holder for dental floss comprising a pair of spaced prongs adapted to have dental floss tightly stretched across the same, a handle for said prongs, means for clamping one end of the dental floss when the handle is in one position relative to said prongs and adapted to clamp both ends of the floss when the handle is in another position, relative to said prongs and a slot in one of said prongs for severing the dental floss, substantially as set forth.

11. A holder for dental floss comprising a pair of spaced prongs adapted to have dental floss tightly stretched across the same, a handle for said prongs, means for clamping one end of the dental floss when the handle is in one position relative to said prongs, adapted to clamp both ends of the floss when the handle is in another position relative to said prongs, said handle having its end roughened for clamping the floss against the bottom of the socket for taking up slack, substantially as set forth.

In witness whereof, I have hereunto set my hand and seal at Whittier, California this fourteenth day of January, A. D. nineteen hundred and twenty-six.

ROBERT WALTER CAMMACK. [L. S.]